Feb. 3, 1959 G. H. DIEHL 2,871,847
COUNTER-FLOW WARM AIR FURNACE
Filed Sept. 13, 1956 2 Sheets-Sheet 1

INVENTOR.
GORDON H. DIEHL
BY
D. C. Staley
ATTORNEY

Feb. 3, 1959

G. H. DIEHL 2,871,847

COUNTER-FLOW WARM AIR FURNACE

Filed Sept. 13, 1956

INVENTOR.
GORDON H. DIEHL
BY
D. C. Staley
ATTORNEY

United States Patent Office 2,871,847
Patented Feb. 3, 1959

2,871,847

COUNTER-FLOW WARM AIR FURNACE

Gordon H. Diehl, Pittsford, N. Y., assignor to General Motors Corporation, Detroit, Mich., a corporation of Delaware Application September 13, 1956, Serial No. 609,567

3 Claims. (Cl. 126—110)

This invention pertains to warm air furnaces, and particularly to a warm air furnace of the counter-flow, ductless type.

Heretofore, no suitable space type heater has been designed which will adequately maintain temperatures within the comfort zone of an enclosure. This invention relates to a forced air furnace wherein the heated air is targeted, or directed, towards the outside walls of the enclosure under high velocity so as to adequately heat an enclosure and maintain the temperatures within relatively small limits between floor and ceiling. Furnaces constructed according to the present invention have been found to distribute heat in an extremely satisfactory manner without the use of conventional ducts which extend into each room. Accordingly, among my objects are the provision of a counter-flow ductless heating unit; a further provision of a counter-flow heating unit including means for directing air flow so as to obtain satisfactory heat distribution; and a still further provision of a counter-flow heating unit of unique assembly including a plenum chamber for distributing the heated air.

The aforementioned and other objects are accomplished in the present invention by incorporating a high speed blower and distributing air through grilles having adjustable louvers which are so positioned to obtain optimum heat distribution throughout the enclosure. Specifically, the warm air furnace of this invention includes an outer casing having disposed therein a burner which may be of either the gas or oil type; a heat exchanger; a blower; and a filter. The blower is arranged above the heat exchange unit, and discharges air downwardly over the heating unit and into a plenum chamber. The plenum chamber is independent of the heating unit, per se, and is disposed beneath the furnace casing. The heated air is discharged into the plenum chamber, which has a plurality of openings cut therein arranged to receive stub ducts which extend through a closet, or enclosing walls, of the furnace room. The stub ducts terminate in grilles having adjustable louvers, or vanes, whereby the air may be directed, or targeted so as to obtain the most satisfactory heat distribution.

In a normal installation, the heating unit, or furnace, is located centrally of the enclosure to be heated and can be enclosed in an alcove or a closet. The stub ducts are merely used to extend through the walls of the closet, but in principle, the furnace is of the "ductless" type. The return air grille can be located on top of the furnace in a horizontal plane, or vertically adjacent the top thereof on one side, depending upon the type of house installation. The heated air is discharged at a high velocity adjacent the floor of the house while the return air is taken in adjacent the top of the heating unit. It has been found that the hot air discharged adjacent the floor and the return air adjacent the ceiling of the enclosure intermix, and by reason of such intermixing, a satisfactory and substantially uniform heat distribution is achieved.

Further objects and advantages of the present invention will be apparent from the following description, reference being had to the accompanying drawings, wherein a preferred form of the present invention is clearly shown.

Figure 1:
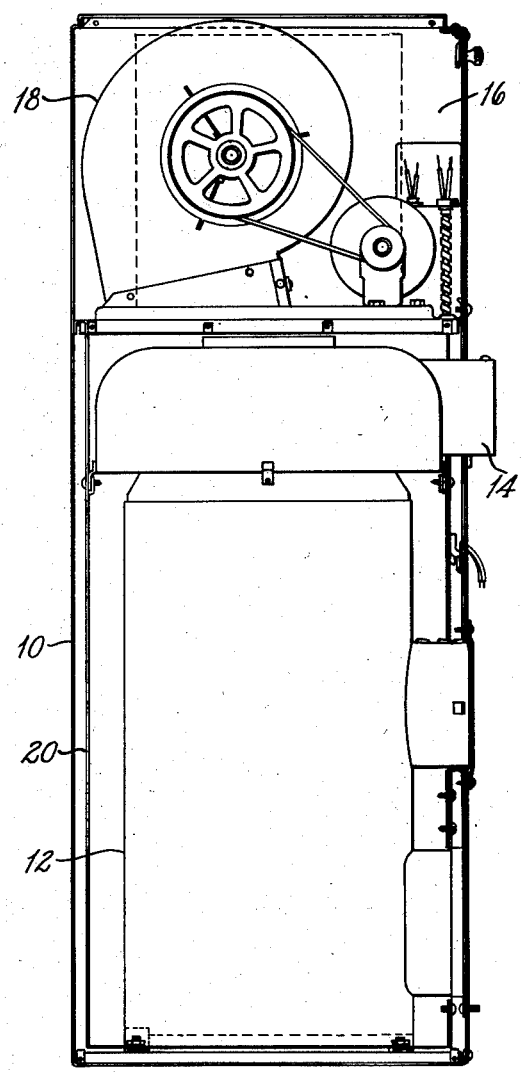
Figure 1 is a side view, with certain parts broken away, of a warm air heating furnace constructed according to this invention.

With particular reference to Figure 1, the heating unit includes an outer casing 10 composed of sheet metal in which is disposed a combined combustion chamber and heat exchanger 12. The heating unit is disposed in the lower portion of the combined combustion chamber and heat exchanger, not shown. The heating unit may be of either the gas or oil fired type. Suffice it to say that during operation of the burner, the products of combustion flow upwardly through the heat exchanger and discharge through a stack outlet 14. Located above the heat exchanger and combustion chamber, is a return air plenum chamber depicted generally by the numeral 16. A centrifugal blower of conventional construction, indicated by the numeral 18 is disposed within the return air plenum chamber, and discharges air downwardly over the heat exchanger. In accordance with conventional practice, the furnace assembly is formed with an inner wall, or wipe sheet 20, which prevents the outer casing 10 from becoming excessively hot.

Figure 5:
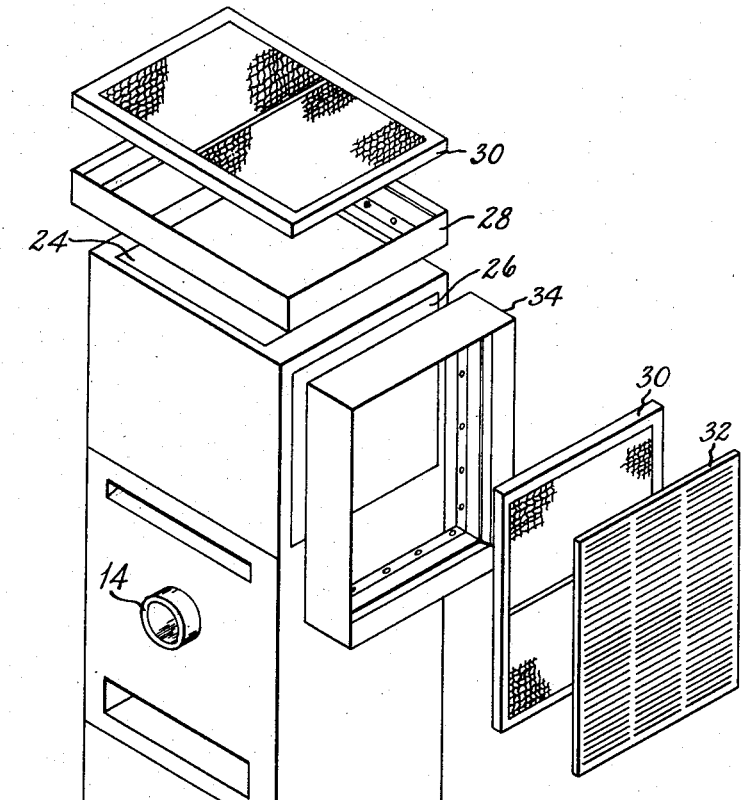
Figure 5 is a composite exploded view of the counter-flow heating unit of this invention.
Figure 5:
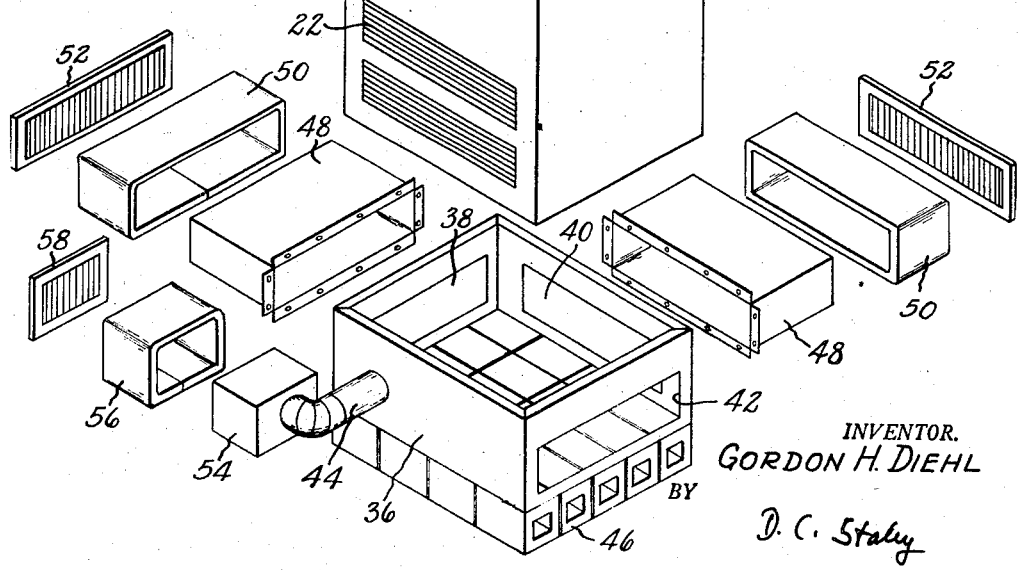

With particular reference to Figure 5, the counter-flow heating system of this invention will be described in greater detail. As seen in Figure 5, the furnace casing 10 includes the stack outlet 14 and inlet air grilles 22 which permit air flow for combustion. The sheet metal housing, or casing 10 can be provided with either an open top such as indicated by numeral 24, or a side wall opening indicated by numeral 26. The location of the opening, either 24 or 26, is determined by the type of house, or enclosure to be heated. Thus, if the enclosure has a cathedral type ceiling, the opening 26 is closed while the opening 24 receives a frame 28 which carries the filter 30 and on top of which a return air grille, indicated by numeral 32, is positioned. Thus, the return air flow to the plenum chamber 16 flows through the top of the furnace. However, in installations having a conventional ceiling, the top 24 is closed and the opening 26 receives a frame 34 and a filter 30 together with the return air grille 32.

The furnace casing 10 is designed to be superposed upon the flanged edges of a sheet metal hot air plenum chamber 36 as shown in Figure 5. The hot air plenum 36 comprises a box-like structure having an open top and an open bottom which may be composed of suitable sheet metal and, as shown, is provided with openings 38, 40, and 42 in three of its side walls. The fourth side wall receives a circular stub duct 44. The bottom of the plenum chamber is formed by suitable ceramic tiles 46.

Each of the openings 38, 40, and 42 is adapted to receive a sheet metal stub duct, two of which are shown and designated by a numeral 48. The stub ducts 48 are formed with flanged ends adapted to be riveted, or otherwise suitably connected to the inner walls of the plenum chamber 36. The stub ducts 48 are adapted to telescopically receive insulation indicated by a numeral 50. The opposite ends of the stub ducts 48 receive diffuser grilles 52, which will be described more particularly hereinafter. Similarly, the round stub duct 44 terminates in a box 54 which is covered by insulation 56 and receives a diffuser grille 58.

Figure 2:
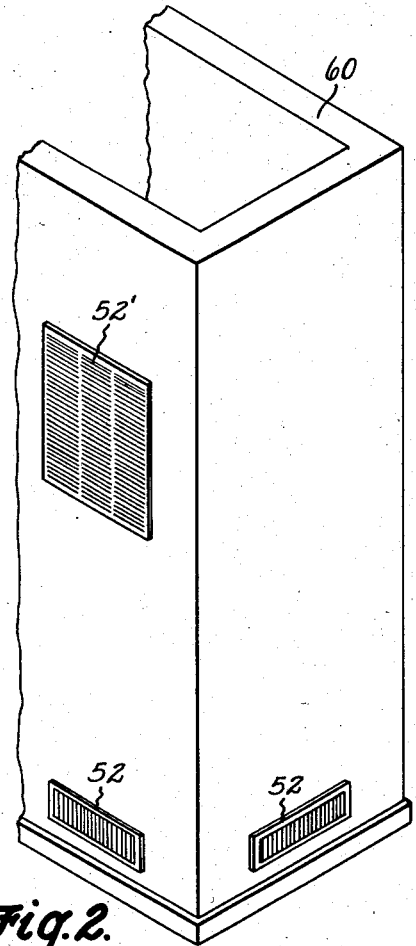
Figure 2 is a fragmentary view depicting a typical installation in a closet, or alcove.
Figure 3:
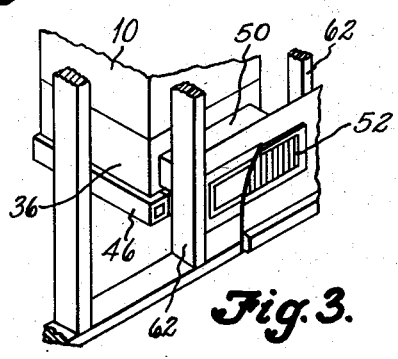
Figure 3 is a fragmentary view, partly in section and partly in elevation, depicting the manner in which the short stub ducts are connected to grilles from the plenum chamber.

With particular reference to Figure 2, a typical alcove, or closed installation of the counter-flow heating unit of this invention is depicted. In this arrangement, the warm air furnace is disposed within the alcove indicated generally by numeral 60. The return air grille 52′, in this instance, is in the side wall of the alcove 60. The warm air diffusers 52 are located in the side walls of the alcove adjacent the floor. With particular reference to Figure 3, a typical installation of the stub ducts and diffuser grilles are shown. In this installation, the furnace casing 10 rests upon the plenum chamber 36 which in turn rests upon the ceramic tile blocks 46. The stub ducts, covered by insulation 50, extend between studs 62 and terminate grilles 52.

Figure 4:
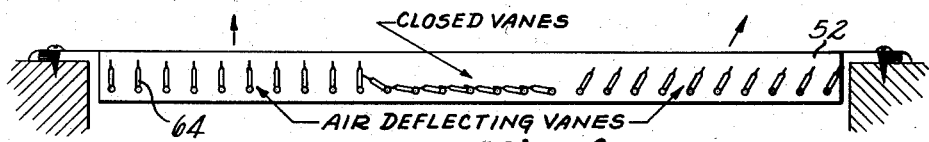
Figure 4 is a view partly in section and partly in elevation, depicting the adjustable air deflecting vanes of the grilles.

With particular reference to Figure 4, the construction of the diffusing grilles 52 will be described. Each diffuser grille 52 includes a plurality of vertically arranged vanes or louvers, 64. Each louver 64 is individually adjustable, and the grille is so designed that the louvers can be adjusted to entirely close off portions thereof. Thus, the grille design enables air to be directed, or targeted towards the cold walls of the enclosure in which the heating unit is disposed. Moreover, to effect the desired heat distribution, certain of the vanes may be entirely closed as depicted in Figure 4, or other vanes may be opened in angle to direct the air to achieve the most satisfactory and uniform heat distribution.

In operation, return air flows through the return air grille and is discharged by the blower downwardly over the heat exchanger disposed within the casing 10. The heated air collects in the plenum chamber 36 and is distributed through the short ducts to the grilles 52 as well as the grille 58. Normally the grille 58 will communicate with the bathroom of the house, or enclosure. The grilles 52 having the adjustable vanes 64, are adjusted so that air is directed towards the outer walls of the enclosure, and the several grilles 52 are so adjusted with respect to each other that the desired uniform heat distribution throughout the entire house is achieved. It is specifically pointed out that the blower discharges air under a substantial velocity, for instance, 1500 feet per minute adjacent the ducts 52, and it is by virtue of the high velocity air discharge which is directed toward the outer walls of the house that satisfactory heating can be achieved.

From the aforegoing it is readily apparent that the present invention provides a unique and simple counter-flow heating unit which can be adapted to various installations and without the use of conventional ducts. It has been found that the heating unit of this invention works extremely satisfactorily and maintains a very close differential between floor and ceiling temperatures.

While the form of embodiment of the invention as herein disclosed constitutes a preferred form, it is to be understood that other forms might be adopted, as may come within the scope of the claims which follow.

What is claimed is as follows:

1. A counter-flow warm air heating unit including, an upright housing, a combustion chamber within said housing having heat exchange surfaces, a blower in said housing above said combustion chamber, said housing having an air outlet opening in the bottom thereof whereby air may be discharged by the blower downwardly across the heat exchanger surfaces and through the bottom opening in the housing, a plenum chamber comprising a sheet metal box structure having an open top communicating with said bottom opening in the housing and flanged edges upon which the housing is supported, said plenum chamber having at least one opening in its side walls for the discharge of air therefrom, said sheet metal box structure also having an open bottom, and a plurality of tile members closing the bottom of said sheet metal box structure to form said plenum chamber.

2. A counter-flow warm air heating unit including, an upright housing, a combustion chamber within said housing having heat exchange surfaces, a blower in said housing above said combustion chamber, said housing having an air inlet at the top thereof and the opening at the bottom thereof, whereby the blower may discharge air downwardly across the heat exchanger and through the bottom opening in the housing, a plenum chamber comprising a sheet metal box-like structure having an open top in communication with said bottom opening in the housing and flanged edges upon which the housing is supported, said plenum chamber having at least one opening in its side walls for the discharge of air therefrom, a duct communicating with the opening in said plenum chamber and with a diffuser grille having adjustable vanes, said sheet metal box structure also having an open bottom, and a plurality of tile members closing the bottom of said sheet metal box structure to form said plenum chamber.

3. A counter-flow warm air heating unit including, an upright housing, a combustion chamber within said housing having heat exchange surfaces, said housing having an air inlet opening in a side wall thereof adjacent to the top and a discharge opening at the bottom, a blower within said housing above said combustion chamber for discharging air downwardly across the heat exchange surface and through the bottom opening of the housing, a plenum chamber comprising a box-like structure having an open top communicating with said bottom opening and flanged edges upon which the housing is supported, said plenum chamber having at least one opening in its side walls for discharging air therefrom, a duct connecting with the opening in said plenum chamber and terminating in a diffuser grille having adjustable vanes whereby the air is discharged from the plenum chamber and may be directed therefrom, said sheet metal box structure also having an open bottom, and a plurality of tile members closing the bottom of said sheet metal box structure to form said plenum chamber.

References Cited in the file of this patent

UNITED STATES PATENTS

| | | |
|---|---|---|
| 1,144,469 | Giles | June 29, 1915 |
| 2,021,408 | Feinberg | Nov. 19, 1935 |
| 2,457,818 | Heiman | Jan. 4, 1949 |
| 2,600,934 | Spieth | June 17, 1952 |
| 2,658,503 | Scheurer | Nov. 10, 1953 |
| 2,734,500 | Myers | Feb. 14, 1956 |